June 4, 1935. L. B. SKINNER 2,003,725
PROTECTION OF METALLIC CONDUITS EXPOSED TO HIGH TEMPERATURES
Original Filed Jan. 28, 1930
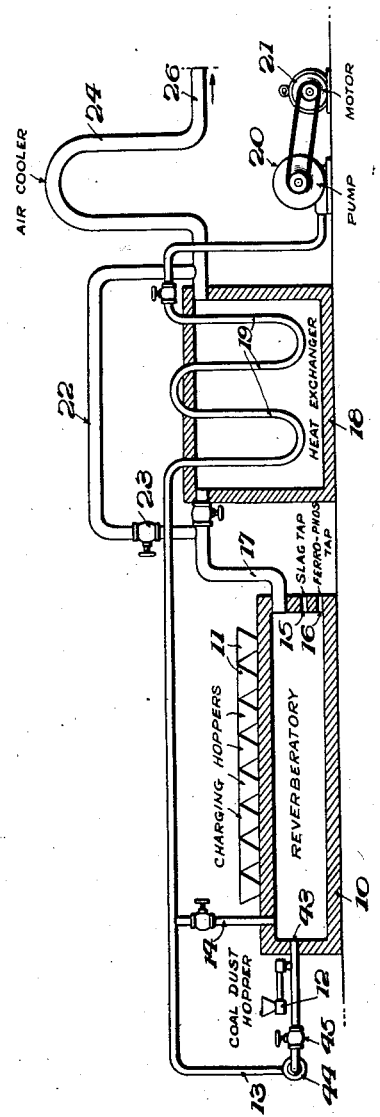
INVENTOR
Lewis B. Skinner.
BY Steward & McKay
his ATTORNEYS Patented June 4, 1935

2,003,725

UNITED STATES PATENT OFFICE 2,003,725

PROTECTION OF METALLIC CONDUITS EXPOSED TO HIGH TEMPERATURES

Lewis B. Skinner, Denver, Colo.

Original application January 28, 1930, Serial No. 424,109, now Patent No. 1,959,086, dated May 15, 1934. Divided and this application February 27, 1934, Serial No. 713,224

6 Claims. (Cl. 23—262)

This invention relates to protection of metallic conduits exposed to high temperatures; and it relates more particularly to a method of protecting metallic conduits such as are employed in the double-surface type of heat regenerators for transferring heat from outgoing furnace gases, fumes or the like to incoming air and other gases to be used in furnace operations; the invention also relating to apparatus comprising a heat regenerator of the type referred to in which the metallic conduit means is provided with protection produced in accordance with the method aforesaid. Still more particularly, the invention pertains to protection of the metallic conduits of heat regenerators employed in furnace operations having to do with the treatment of phosphates to obtain phosphorus, phosphoric acid, or other phosphorus compounds therefrom.

An important feature of the invention is that the metallic surfaces of the heat regenerator conduit or conduits are protected by a coating formed thereon and consisting essentially of phosphorus pentoxide and flue dust. In accordance with the method of the invention, the coating is initially obtained by exposing the metallic surfaces preliminarily to hot gases carrying phosphorus pentoxide and flue dust until an adherent protective coating is formed; the temperature of the gases at this stage being insufficiently high, however, to cause destructive action on the metallic surfaces. After a protective coating of the desired thickness has thus been formed on the outer surfaces of the metal conduits or pipes, furnace gases of temperatures sufficiently high to be destructive to unprotected metal pipes may then be safely contacted with the pipes of the heat regenerator, while a gaseous medium, such as air to be preheated for furnace operation, is passed through the pipes and is thereby heated to the desired extent.

The method and apparatus of the present invention are particularly useful with any furnace process of treating phosphates in which it is desirable to preheat the air for combustion by the outgoing furnace gases or fumes and in which those outgoing gases or fumes carry phosphorus, largely in the form of phosphorus pentoxide, and are at a temperature sufficiently high to injure or destroy such metal pipes as are customarily employed in a heat regenerator of the double-surface type.

This application is a division of my copending application Serial No. 424,109, filed January 28, 1930 now Pat. No. 1,959,086. In the parent application, a process and apparatus for treating phosphates to obtain phosphorus, phosphoric acids or other phosphorus compounds are described and the process is claimed. While the method and apparatus of the present divisional application are not limited to use in association with the furnace process of said copending application, they are particularly adapted to such associated use. For that reason, the present method and apparatus will be described in connection with the furnace process of treating phosphates set forth in the parent application, but with only such reference to that furnace process as is required to illustrate one example of use of the present invention.

In the furnace process of treating phosphates to obtain phosphorus, phosphoric acid or other phosphorus compounds therefrom, described and claimed in said copending application, phosphatic material containing sufficient silica to form a fusible slag, and carbonaceous material, are heated in a fuel-fired reverberatory furnace to a temperature sufficient to drive off free phosphorus from the charge. When phosphoric acid is the desired end product, the furnace is so fired as to cause a current of oxidizing gases to sweep therethrough above the charge, and these gases oxidize the evolved phosphorus to phosphorus pentoxide, the latter then discharging with the outgoing combustion gases and fumes from the furnace.

As the employment of a relatively high temperature, 1200° C. or above, is distinctly desirable in the practice of the foregoing process, it is found that the firing of the furnace to the required temperature can best be effected by the combustion of a suitable fuel with the aid of preheated combustion air; and for economy of operation it is desirable, if possible, to utilize the intensely hot dust-laden gases passing from the furnace to preheat the air for combustion. But the heat regenerators of the prior art are not suitable for use with a furnace process in which the gases discharged from the furnace are at so high a temperature and carry such large amounts of material in suspension as in the process of my copending application. The disadvantages in the use of the prior art heat regenerators with such a furnace process appear from the following facts as to their construction and functioning.

Heat regenerators are of two types. The first type includes those in which the flow of the heating gases and the gases to be heated through the structure is continuous and the heat transference is by conduction through a separating wall. This method of heat exchange is known as the double-surface system. The second type involves the intermittent flow of the heating and heated gases alternately through the same structure, usually a checkerwork of firebrick. This single-surface type of heat exchanger depends on alternately heating and cooling large surfaces of refractory material.

Where the first or double-surface type of regenerator is used it is very desirable to have separating walls having relatively high heat conductivity per unit area of exposed surface. Walls of refractory materials like firebrick must have relatively great thickness to give adequate mechanical strength and this thickness coupled with a very low specific heat conductivity results in poor heat exchange by conduction through such walls. On the other hand, if the second or single-surface type of regenerator is used, although it has the advantage that only surface heating of the firebrick checkerwork is necessary, difficulties arise in cases where the heating gases carry large amounts of material in suspension, because the checkerwork acts as a collecting means for dust and the spaces between the bricks silt up and the gas flow is soon interfered with or even prevented.

The difficulty with regard to silting up experienced with checkerwork may be avoided by using heat regenerators of the double-surface type having separating walls of metal, usually iron or steel, and large spaces or passages for the heating gases. In the case of phosphoric acid manufacture, however, new problems arise, chiefly the fact that in such manufacture the temperature of the heating gases is 1100° to 1200° C. or more and iron conduits or pipes cannot be heated above 800–900° C. without destruction.

A primary object of the invention forming the subject-matter of this divisional application is to enable the use of iron or other metal pipes in a heat regenerator of the double-surface type with heating gases which are above the destructive temperature of the metal of which the pipes are made.

I have discovered that if fumes which carry phosphorus pentoxide and flue dust and which are highly heated but are insufficiently hot to destroy unprotected metal are brought into contact with metallic surfaces, there is deposited on the metal a tenaciously adherent coating or layer of solid material. This layer is sufficiently thick adequately to protect the metal both from oxidation and also, on account of the low heat conductivity of said material, from excessive heating even by furnace gases as hot as 1200° C. or higher. Accordingly the metal surface so protected may thereafter be exposed to gases so hot that they would destroy it if unprotected. This coating or layer will tenaciously adhere to a thickness sufficient to thoroughly protect the metal, but it will not build up sufficiently thick to retard heat transference undesirably, because the adherence of the fume deposit to metal is much more tenacious than to the previously deposited material. Therefore, the building up proceeds until a certain thickness of coating has been formed, and beyond this point there is no material accretion.

Referring again to the aforesaid furnace process of treating phosphatic material as an illustrative example of a process with which my present invention may be used, the present invention renders it feasible and practical to use a heat regenerator with iron pipes for preheating air to be used in firing the furnace. By operating the furnace slowly and carefully at first, a coating may be built up around the iron which provides the necessary protection to the pipes while permitting effective transfer of heat from the heating gases (i. e. furnace gases) around the pipes to the air passing through them.

Examination of the coating formed reveals the fact that it is formed from a mixture of flue dust and phosphorus pentoxide, although its final composition is uncertain and may include calcium phosphates, metaphosphoric acid and other compounds. The dust alone is not adherent. Therefore, the described adherent coating must be produced by the combined action of two materials, neither of which alone is capable of producing such a coating.

The coating exerts its protective action as the result of the low heat conductivity of the coating as compared with the metal it protects. It may be assumed that the final air (i. e. the heated gas) temperature within the pipe is 500° C., with the inner surface of the metal at 600° C.; while the temperature of the furnace or flue (i. e. heating) gases around such pipe is 1200° C. Then, with equal thicknesses of metal and coating and a heat conductivity ratio of 10 : 1 for metal and coating respectively, the temperature drop between the outer surface of the coating and the inner surface of the pipe will be divided in approximately the same ratio, so that the temperature of the outer surface of the iron will be around 660° C. or well below the softening or destruction point of iron or steel. This is only a typical example, of course.

While the invention is capable of being carried out in various forms of apparatus, one form of apparatus which is suitable for practicing the invention is comprised in the plant shown more or less diagrammatically in the single view of the accompanying drawing, which plant also includes the furnace shown and described in my copending application for carrying out the furnace process claimed therein.

The reverberatory furnace of the plant is indicated at 10, and is shown as provided with a series of charging hoppers 11 along its sides. The phosphate rock, or other phosphatic material to be treated, together with sufficient siliceous material to form a fusible slag, and carbonaceous material in the amount contemplated by the process described and claimed in my copending application, are fed through the side hoppers into the furnace. As shown, the firing of the furnace is by powdered coal from a hopper 12 blown into the furnace through burners 43 by preheated air supplied through pipe 13, while additional air may be introduced through by-pass 14 around the burners. A plurality of burners, only one of which appears in the drawing, are used, being connected to a header 44 through pipes, valved at 45, to enable one or more of the burners to be cut out if desired. The charge is reduced and melted down in the furnace and the molten slag formed is drawn off through an aperture 15 at the end of the furnace, while any iron present in the charge forms ferro-phosphorus, and this, being heavier than the slag, forms a molten layer beneath the latter and may be drawn off from time to time through an aperture 15.

The furnace gases carrying phosphorus values, mostly as phosphorus pentoxide, pass from the furnace through a flue 17 to the heat regenerator 18 which is the apparatus unit of the plant to which my present invention more particularly pertains.

As shown, the heat exchanger or regenerator comprises a brickwork chamber within which a series of loops 19 of iron pipe depend from the roof. Through this pipe the air to be preheated is forced by a blower 20 driven by a motor 21. Any number of these pipe loops may be provided, their disposition and aggregate length being a function of the amount of heat exchange desired. A bypass 22, controlled by a valve 23, furnished means for passing part of the gases from the reverberatory furnace around the heat exchanger, if desired, to lower the temperature of the air for combustion.

The pipes 19 are of metal, iron in the present example; but, assuming the plant to have been preliminarily put in running condition, said pipes are already covered by an adherent protective layer of a deposited mixture or combination of phosphatic material with flue dust from the furnace, as before explained. Therefore said pipes may be exposed, without danger of destruction, to temperatures destructive to unprotected iron.

After the flue dust and phosphoric acid have formed the described adherent protective coating on the pipes, there is much less tendency for such materials to adhere. Hence the heavier particles carried by the furnace or flue gases in the ensuing operations at higher temperatures simply drop to the bottom of the chamber, whence they can be removed in any convenient manner without interrupting operation of the furnace.

From the heat exchanger or regenerator the furnace gases pass through an air cooler 24 and thence to one or more acid towers or other collecting means (not shown) for the collection of phosphorus values, usually as phosphoric acid.

What is claimed is:

1. In the art of heat exchange by regeneration, the method which comprises preliminarily passing combustion gases carrying phosphorus pentoxide and flue dust from a phosphate treating furnace into contact with the outer surfaces of metal regenerator pipes, while controlling the heat in such manner as to prevent substantial destructive action on said metal pipes, until an adherent protective coating formed of phosphorus pentoxide and flue dust is deposited thereon, and then operating the furnace in such manner that the gases passing in contact with the coated pipes are at a temperature sufficiently higher to be destructive to unprotected metal pipes, and passing air for combustion through said coated pipes, the conditions of operation during and after the formation of said coating being such as to prevent said coating from building up to a thickness beyond that permissible for effective transfer of heat from the exterior to the interior of said pipes.

2. The combination, with a furnace, of a heat regenerator comprising a chamber into which gases are discharged from said furnace, and a metal conduit disposed in said chamber and arranged to conduct air for combustion through said chamber for supply to said furnace, said conduit having its outer surface protected by an adherent coating formed from phosphorus pentoxide and flue dust.

3. The combination as in claim 2 and in which said furnace is of the reverberatory type.

4. The combination as in claim 2 and in which the metal of said conduit is ferrous in character.

5. Furnace apparatus for producing phosphoric acid in which free phosphorus is derived from the charge and burnt to phosphorus pentoxide in a stream of gas traveling through the furnace, said apparatus comprising, in combination with a furnace, a heat regenerator through which the gases containing the burnt phosphorus travel before being subjected to condensation, said heat regenerator having a metal (preferably iron or steel) conduit disposed therein arranged to conduct air therethrough to be preheated and supplied to the furnace in firing the same, said conduit having its outer surface protected by a coating formed from phosphorus pentoxide and flue dust.

6. In the art of double-surface heat exchange by regeneration, wherein a gas to be heated is passed through a metallic conduit exposed exteriorly to heating gases, the method of protecting the outer surface of such a metallic conduit which comprises enveloping said surface with an adherent coating formed from phosphorus pentoxide and flue dust by deposit from hot gases containing the same, under conditions such that the thickness of said coating is so limited that, although it is adequate to protect the conduit against destruction by heating gases, it permits effective transfer of heat into the interior of said conduit.

LEWIS B. SKINNER.